J. P. OWENS.
HARROW.
APPLICATION FILED AUG. 20, 1912.
1,068,526.
Patented July 29, 1913.
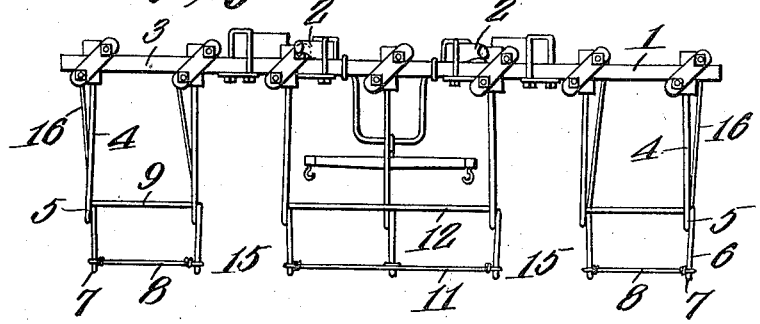
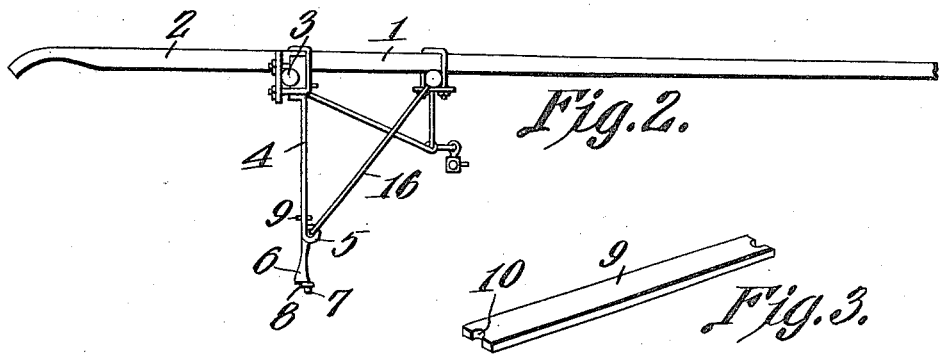
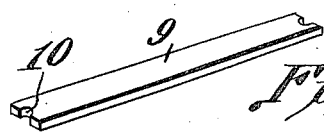
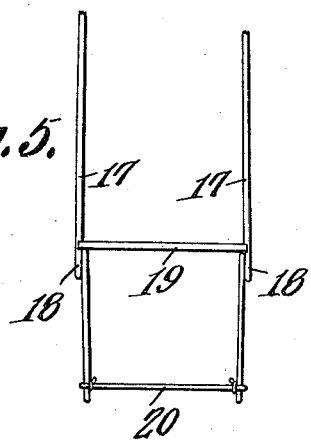
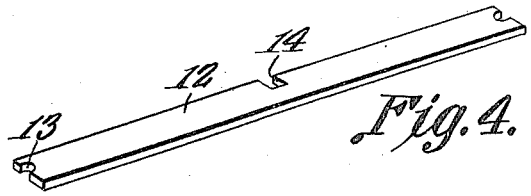
Witnesses
James P. Owens,
Inventor
by
Attorneys

UNITED STATES PATENT OFFICE.

JAMES POWELL OWENS, OF WEATHERFORD, TEXAS.

HARROW.

1,068,526.　　　Specification of Letters Patent.　　Patented July 29, 1913.

Application filed August 20, 1912. Serial No. 716,094.

*To all whom it may concern:*

Be it known that I, JAMES P. OWENS, a citizen of the United States, residing at Weatherford, in the county of Parker and State of Texas, have invented a new and useful Harrow, of which the following is a specification.

This invention relates to agricultural appliances and more particularly to improved means whereby the roots of small vegetable growths, such as weeds, grass, cotton plants and the like may be cut off close to but below the surface of the ground, the cutting means being simple, durable and inexpensive and offering the minimum resistance to the operation of the appliance so that a large machine can be actuated with comparatively slight power.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention, as embodied in a cotton chopper, has been shown.

In said drawings:—Figure 1 is a rear elevation of a cotton chopper showing the improved means for cutting the roots of plants. Fig. 2 is a side elevation of the cotton chopper. Figs. 3 and 4 are perspective views of the spreading means utilized. Fig. 5 is a rear elevation of a slightly modified structure. Fig. 6 is a transverse section through a modified form of cutting element.

Referring to the figures by characters of reference 1 designates a structure made up of any desired arrangement of beams suitably connected and from which extend handles 2. This structure includes a rear cross beam 3 and secured to this cross beam in any suitable manner are downwardly extending spring teeth 4 adjustable relative to each other and each preferably including, at an intermediate point, an eye 5. The lower end of each tooth is broadened from front to rear, as shown at 6 and has a downwardly extending toe 7.

In the form of the invention illustrated in Figs. 1 and 2, the teeth 4 are arranged in two end pairs while interposed between these pairs is a group of three teeth. The teeth of each pair are connected by a small but strong wire 8 of steel or any other suitable material, the ends of the wire being wrapped about and securely fastened to toes 7 of the teeth. A spreading strip 9 is interposed between the teeth and has notches 10 in its ends to receive portions of the teeth. This spreading strip is slightly longer than the distance between the lower ends of the teeth so that, when the strip is interposed between the teeth close to the eyes 5, it will spring the teeth laterally and cause them to pull on the wire 8 and thus hold it taut. The central group of teeth 4 is provided with a wire 11 similar to the wire 8 but which is wrapped about and suitably secured to the toes 7 of the three teeth constituting said group. A spreading strip 12 is interposed between the side teeth of the group and has notches 13 in its ends for receiving portions of said teeth. Another notch 14 extends into one edge of the strip 12 adjacent its center and is adapted to receive a portion of the middle tooth of the group. Thus it will be seen that when the strip 12 is in place, it will bow the end teeth of the group laterally and cause them to hold the wire 11 taut under all conditions. By arranging the teeth in groups as shown, clear spaces are provided between the groups, as shown at 15. Any suitable arrangement of braces 16 may be extended forwardly from the teeth 4, certain of these braces being preferably attached to the eyes 5 of the teeth.

It is to be understood that when the device herein described is to be used for cutting out cotton plants, it is to be drawn transversely of the rows of plants and the broad lower ends of the teeth 4 will plow into the soil so as to support the wires 8 and 11 below but close to the surface of the soil. Thus, as the appliance is drawn transversely of the rows, the wires 8 and 11 which are held taut, will cut through the roots of the vegetable growths in the paths thereof and only those plants in line with the spaces 15 will remain standing. Thus, by adjusting the teeth 4 toward or from each other the distances between the spaces can be varied at will and the size of said spaces can be controlled. Also, if desired, any other suitable groupings of teeth can be employed, it merely being necessary, in every instance to have the wires strung taut at the points necessary in order to cut along the proper path.

In Fig. 5 two teeth 17 have been shown and it will be seen, by referring to said figure, that the eyes 18 of the teeth are so located that the spacing or spreading strip 19 can bear downwardly, at its ends, upon the eyes and thus be held against downward displacement. This arrangement of parts can be followed out in the construction shown in Fig. 1. Furthermore, if desired, an implement having but two teeth can be used such an implement being particularly designed for use in cultivating between rows, as where the plants, for example, Indian corn, are too high for the beam 3 to pass over them without breaking the plants.

It is to be understood that wires held taut in the manner described can be used as substitutes for various types of shovels and like implements now in use and is advantageous for the reason that, as a very small surface is presented to the soil, the appliance can be more readily drawn than one utilizing shovels and similar implements having broad active surfaces. Instead of using ordinary wire, a thin strip or flattened wire, such as shown in Fig. 6 may be utilized.

What is claimed is:—

1. An agricultural appliance including spring teeth, a flexible connection between the lower ends thereof and constituting a cutting element, and spreading means interposed between the teeth and constituting means for holding the connection taut.

2. An agricultural appliance including spring teeth, a flexible connection between the lower ends thereof and constituting a cutting element, and means interposed between the teeth for bowing them laterally to exert a constant pull upon the connection and to hold it taut.

3. An agricultural appliance including spring teeth having outwardly extending toes at their soil engaging ends, a flexible connection between said toes and constituting means for cutting roots close to and below the surface of the soil, and spreading means interposed between the teeth for bowing the teeth and holding the connection taut.

4. An agricultural appliance including spring teeth having toes at their soil engaging ends, a flexible connection between said toes and constituting means for cutting roots close to and below the surface of the soil, and spreading means interposed between the teeth for bowing the teeth and holding the connection taut.

5. An agricultural appliance including spring teeth having toes at their soil engaging ends, a flexible connection between said toes and constituting means for cutting roots close to and below the surface of the soil, and spreading means interposed between the teeth for bowing the teeth and holding the connection taut, said spreading means having notched terminals for the reception of the teeth.

6. An agricultural appliance including spring teeth having toes at their soil engaging ends, a flexible connection between said toes and constituting means for cutting roots close to and below the surface of the soil, and spreading means interposed between the teeth for bowing the teeth and holding the connection taut, each of said teeth including eyes, said spreading means bearing downwardly upon the eyes.

7. An agricultural appliance including a structure, spring teeth depending therefrom and including eyes, a flexible connection between the lower ends of the teeth, said connection constituting means for cutting under and close to the surface of the soil, a spreading device interposed between and adapted to bow the teeth laterally to hold the connection taut, and braces connecting said structure to the eyes.

8. A cotton chopper including spaced groups of spring teeth, a flexible connection between the teeth of each group, said connections constituting cutting elements, and spreading means interposed between the teeth of each group for bowing the teeth laterally and holding the connection taut.

In testimony that I claim the foregoing as my own, I have hereto affixed my signature in the presence of two witnesses.

JAMES POWELL OWENS.

Witnesses:
JAMES JOHNSON,
W. R. HAWKINS.

---

Copies of this patent may be obtained for five cents each, by addressing the "Commissioner of Patents, Washington, D. C."